(12) United States Patent
Wong et al.

(10) Patent No.: US 9,331,804 B2
(45) Date of Patent: May 3, 2016

(54) USING MULTIPLE OSCILLATORS ACROSS A SUB-NETWORK FOR IMPROVED HOLDOVER

(71) Applicant: Alcatel-Lucent Canada Inc., Ottawa (CA)

(72) Inventors: Kin Yee Wong, Ottawa (CA); Peter Roberts, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 132 days.

(21) Appl. No.: 13/899,720

(22) Filed: May 22, 2013

(65) Prior Publication Data

US 2014/0348278 A1    Nov. 27, 2014

(51) Int. Cl.
*H04L 7/00*    (2006.01)
*H04J 3/06*    (2006.01)
*H04J 3/12*    (2006.01)
*H04J 3/14*    (2006.01)

(52) U.S. Cl.
CPC .............. *H04J 3/0638* (2013.01); *H04J 3/0658* (2013.01); *H04J 3/0688* (2013.01); *H04J 3/12* (2013.01); *H04J 3/14* (2013.01)

(58) Field of Classification Search
CPC ....... H04L 7/0083; H04L 7/033; H04L 7/143; H04J 3/0688; H04J 3/0608
USPC .................. 370/464, 498, 503–520; 375/354, 375/356–358
See application file for complete search history.

(56) References Cited

U.S. PATENT DOCUMENTS

| | | | |
|---|---|---|---|
| 2011/0150005 A1* | 6/2011 | Chen et al. ..................... | 370/503 |
| 2012/0087402 A1* | 4/2012 | Patoine ......................... | 375/226 |
| 2012/0195253 A1* | 8/2012 | Irvine .......................... | 370/328 |
| 2012/0288280 A1* | 11/2012 | Sui ................................ | 398/66 |
| 2014/0254735 A1* | 9/2014 | Nemawarkar et al. ........ | 375/376 |
| 2014/0348278 A1* | 11/2014 | Wong et al. ................... | 375/355 |

* cited by examiner

*Primary Examiner* — James M Perez
(74) *Attorney, Agent, or Firm* — Marks & Clerk

(57) ABSTRACT

A method and system are provided for improving maintenance of timing information when a node enters holdover due to a lost connection between a sub-network and a reference clock. Each node within the sub-network sends information concerning the drift of its local oscillator to a single node, and the single node uses this information to determine timing information for the entire sub-network. The single node may also use knowledge of the characteristics of the local oscillators. In this way, drift from the reference clock can be minimized without incurring significant added hardware costs.

14 Claims, 6 Drawing Sheets

USING MULTIPLE OSCILLATORS ACROSS A SUB-NETWORK FOR IMPROVED HOLDOVER

FIELD OF INVENTION

This invention relates to timing within telecommunication nodes of a network, and more particularly to synchronization of clocks in a sub-network.

BACKGROUND

Telecommunication nodes in a network maintain synchronization of their docks by use of a single reference clock within the network. The reference clock transmits time-of-day information and/or a reference signal with a specified frequency. If a connection between a sub-network and the reference clock fails, one of the nodes in the sub-network enters "holdover". This node uses its own local oscillator to maintain the last frequency/time to the best of its ability. It is important that the accuracy of the clocks of the sub-network relative to the reference clock, to which a connection is no longer possible, be maintained as high as possible. In this way the time knowledge of the sub-network matches the time knowledge of other parts of the network, so that handoffs to other sub-networks are possible for example.

However all oscillators drift in frequency because of environmental conditions, such as the temperature of the oscillator, and aging characteristics. One solution to maximizing the accuracy of the holdover in a sub-network is to use an expensive oscillator in the node which enters the holdover for the sub-network. More expensive oscillators usually have less drift. However this increased expense of the oscillator is not always practical, especially when there are many possible sub-networks such as in small cells, metrocells, and cell site routers. These more expensive oscillators usually also occupy more space within the node, which may be undesirable.

Another solution, which may be used together with a more expensive oscillator, is to control the ambient temperature of the oscillator so as to reduce drift. These are termed oven controlled oscillators or double over-controlled oscillators. However such control of temperature also requires more space and is more expensive than oscillators which are not oven controlled.

Yet another solution is to install a GPS receiver at the node responsible for holdover. While accurate maintenance of the clock is possible using a GPS receiver, the addition of a GPS receiver to a node adds to the cost of the node.

SUMMARY

According to one aspect, a method of determining timing information in a sub-network of telecommunication nodes when connection to a reference clock is lost is provided. The subnetwork contains a master node and at least one slave node. At the master node, drift information of each slave node is received from the respective slave node. At the master node a drift compensation factor is determined using the received drift information. A corrected adjustment value is calculated at the master node using the drift compensation factor and drift information of the master node. A local oscillator signal of the master node is adjusted using the corrected adjustment value so as to generate a local timing signal.

According to another aspect, a first telecommunications node within a subnetwork comprising at least one additional telecommunications node is provided. The first node has a drift value calculator which calculates a drift compensation factor from drift information collected from each of the at least one additional node. The first node also has a local oscillator generating an oscillator signal. The first node also has a digital control circuit which generates a local timing signal from the oscillator signal, the drift compensation factor, and drift information of the first node.

According to yet another aspect, a method of determining timing information in a subnetwork when connection to a reference clock is lost is provided. The subnetwork contains a plurality of telecommunications nodes, each node having a local oscillator. One of the nodes is designated as a master node, and each remaining node is designated a slave node. At the master node drift information of each slave node is received from the respective slave node. At the master node a drift compensation factor is determined using the received drift information. At the master node a corrected adjustment value is generated using the drift compensation factor. A local oscillator signal of the master node is adjusted using the corrected adjustment value and drift information of the master node to generate a local timing signal. The local timing signal is transmitted from the master node to each slave node.

According to yet another aspect, a system is provided, the system including more than one telecommunications nodes within a subnetwork. One of the nodes is a master node and each remaining node is a slave node. Each slave node includes a drift information calculator. Each drift information calculator is for determining drift information of a local oscillator of its slave node and for transmitting the drift information to the master node. The master node includes a drift value calculator for collecting the drift information from each slave node and for calculating a drift compensation factor from the collected drift information. The master node also includes a digitally controlled oscillator for adjusting a local oscillator signal using the drift compensation factor and drift information of the master node so as to generate a local timing signal. The master node includes a transmitter for transmitting the local timing signal to each slave node.

The methods of embodiments of the invention may be stored as logical instructions on a non-transitory computer-readable storage medium in a form executable by a computer processor.

Embodiments of the invention allow an improved maintenance of frequency/time in telecommunication nodes in a sub-network following a lost connection to a reference clock, without adding significantly to the cost of the nodes. By using information gathered from the local oscillators of all nodes within the sub-network, one of the nodes can improve the accuracy of the frequency/time it sends to the rest of the nodes in the sub-network.

BRIEF DESCRIPTION OF THE DRAWINGS

The features and advantages of embodiments of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

Figure 1:
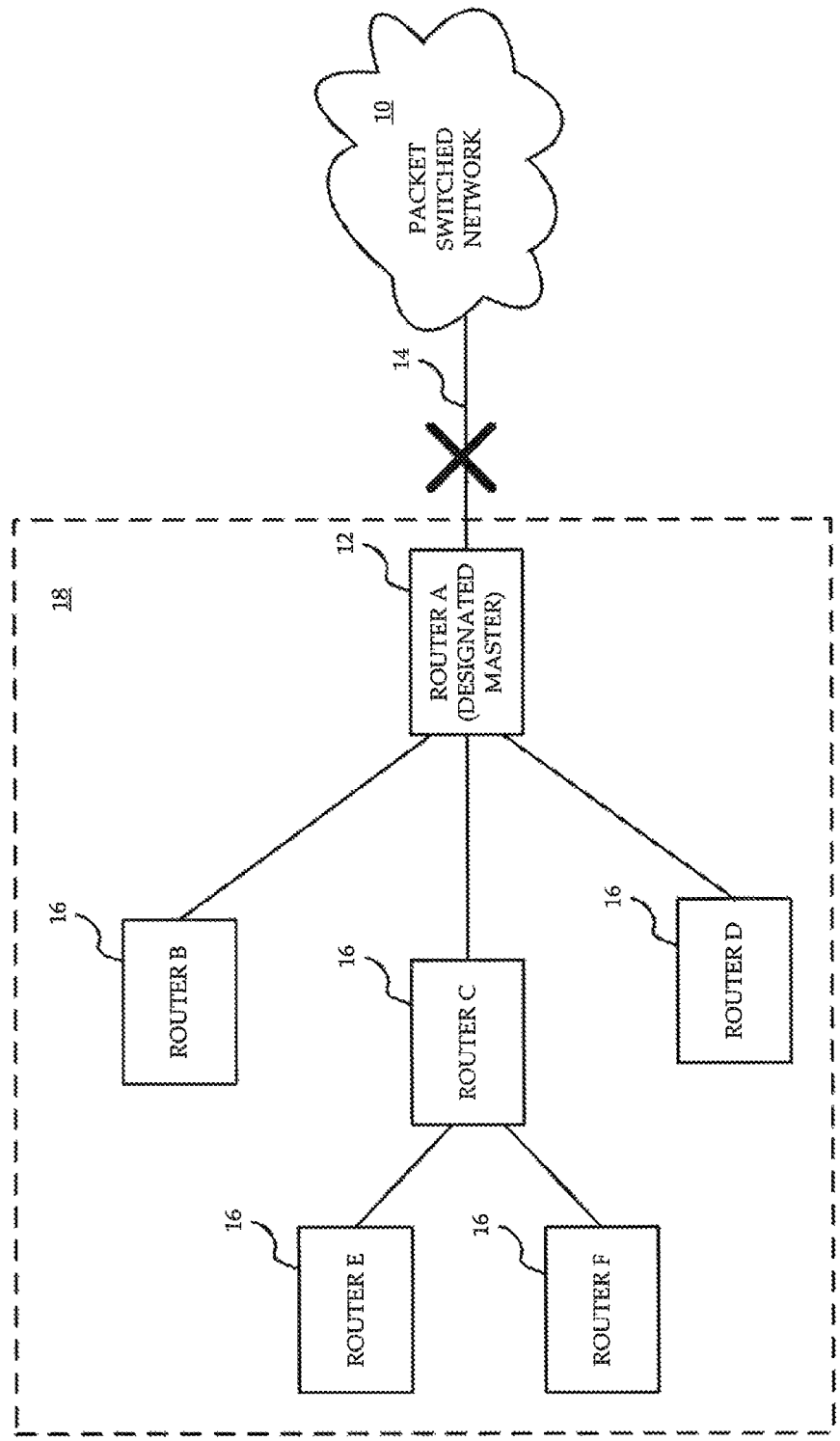
FIG. 1 is a block diagram of a portion of a telecommunications network according to one embodiment of the invention.

Referring to FIG. 1, a block diagram of a portion of a telecommunications network according to one embodiment of the invention is shown. A packet switched network 10 is normally in communication with a first telecommunications node 12, Router A, through a communications link 14. The first node 12 is in communication with other telecommunication nodes 16 (Router B, Router C, and Router D), and Router C 16 is in communication with yet other telecommunication nodes 16 (Router E, Router F). Collectively, the nodes 12 and 16 form a sub-network 18. A failure has occurred in the communications link 14, and as a result the sub-network 18 does not receive signals indicative of a reference clock from the packet switched network 10. For reasons explained below, the node 12 (Router A) is referred to herein as the master node 12, and the other nodes 16 (Router B, Router C, Router D, Router E, Router F) are each referred to as a slave node 16.

The portion of a telecommunications network shown in FIG. 1 is for illustrative purposes only. More generally there will be one master node 12 and at least one slave node 16 with which the master node 12 is in communication. If there is more than one slave node 16, then any of the slave nodes beyond a first of the slave node 16 may be in communication with the master node only via another slave node 16.

Each node 12 and 16 in the sub-network 18 is shown as a router. More generally each node may be any type of telecommunication node, including switches.

Within the sub-network 18, the node closest to the packet switched network 10 need not necessarily be the master node 12. Upon failure of connection 14, an algorithm is normally used to determine which of the nodes in the subnetwork is to be designated the master node. However since timing information is determined using the local oscillators of all nodes it makes little, if any, difference which of the nodes is designated as the master node. For the purposes of illustration, the node closest to the packet switched network 10 is designated herein as the master node 12.

Figure 2:
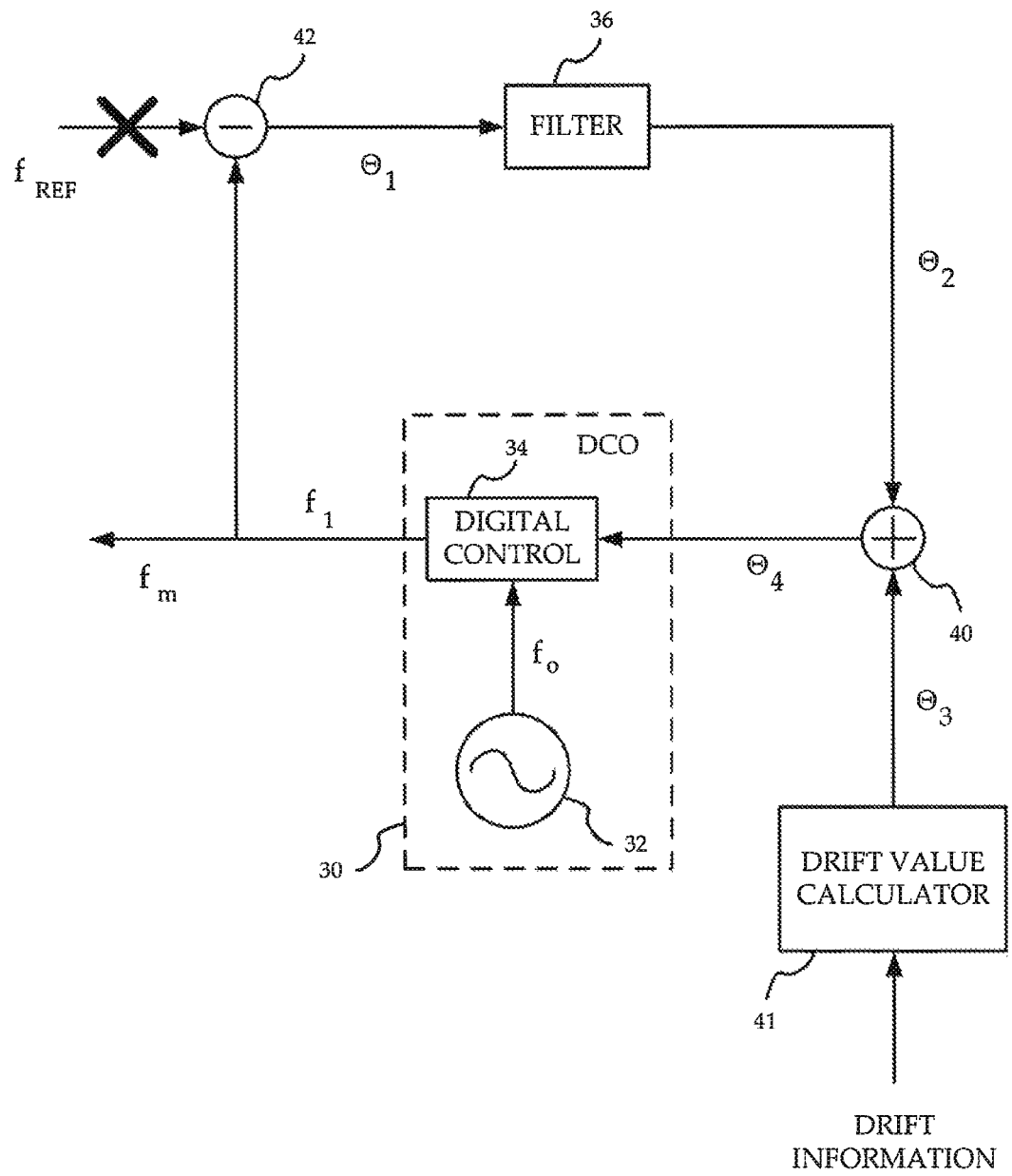
FIG. 2 is a block diagram of the timing portion of the master node of FIG. 1 according to one embodiment of the invention.

Referring to FIG. 2, a block diagram of the timing portion of the master node 12 of FIG. 1 according to one embodiment of the invention is shown. Throughout this description, the designation "$f_i$" refers to a signal having a frequency of $f_i$. In normal operation, a phase locked loop (PLL) ensures that the frequency of a signal $f_1$ produced by a Digitally Controlled Oscillator (DCO) 30 and used by the node 12 as a local timing signal matches the frequency of a reference signal $f_{ref}$ received from a reference clock. The PLL is used because the frequency of an oscillator signal $f_o$ produced by a local oscillator 32 within the DCO 30 may drift due to various factors, including aging, temperature variations, and vibration. A digital control circuit 34 within the DCO 30 uses an adjustment factor to adjust the phase of the oscillator signal $f_0$ to produce the DCO signal $f_1$. A phase compensator 42 compares the phase of the DCO signal $f_1$ with the phase of the reference signal $f_{ref}$ to generate a phase error $\Theta_1$. A filter 36 dampens out short term variations in the phase error and over time provides a stable adjustment value $\Theta_2$. This is normally used as input to the digital control circuit 34, which adjusts $f_0$ so that the phase (and hence the frequency) of $f_1$ should match closely that of $f_{ref}$. The DCO signal $f_1$ is then used as the local timing signal.

The timing portion of the master node 12 also includes a drift value calculator 41 and an adjustment value adjuster 40. During normal operation, i.e. when the reference signal $f_{ref}$ is present, the drift value calculator 41 is inactive or outputs only a value of zero. The adjustment value adjuster 40 simply adds the adjustment value $\Theta_2$ to a value of zero, (i.e., $\Theta4=\Theta_2$) and the value used by the digital control circuit 34 to adjust the oscillator frequency $f_o$ is simply the adjustment value $\Theta_2$. However when the communication link 14 fails, the master node 12 no longer receives the signal $f_{ref}$, as shown in FIG. 2. In such an event, there is no phase error $\Theta_1$ since there is no reference signal $f_{ref}$. As such, the filter 36 does not accept phase errors as an input and instead maintains the adjustment value $\Theta_2$. The drift value calculator 41 however generates a drift compensation factor $\Theta_3$ from drift information collected from the slave nodes 16 within the subnetwork 18 when the communication link 14 fails. The calculation of the drift compensation factor $\Theta_3$ is described below with reference to FIG. 4. The adjustment value adjuster 40 generates a corrected adjustment factor $\Theta_4$ by adding the drift compensation factor $\Theta_3$ to the adjustment factor $\Theta_2$ held over by the filter 36. Since the adjustment factor $\Theta_2$ indicates the drift of the master node 12, the corrected adjustment factor $\Theta_4$ used in generating the local timing signal is generated using drift information of the slave nodes 16 and of the master node 12.

The DCO signal $f_1$ is also passed to the slave nodes 16 using a transmitter (not shown in FIG. 2) of the master node 12, such as by using IEEE 1588v2. This signal is designated $f_m$ in FIG. 2 for consistency with FIG. 3, but is equivalent to $f_1$ in FIG. 2. In this way, the drift information provided by the slave nodes 16 is used when adjusting the local oscillator signal $f_0$ to the DCO signal $f_1$, which is also provided as a timing signal to all nodes within the subnetwork 18.

Figure 3:
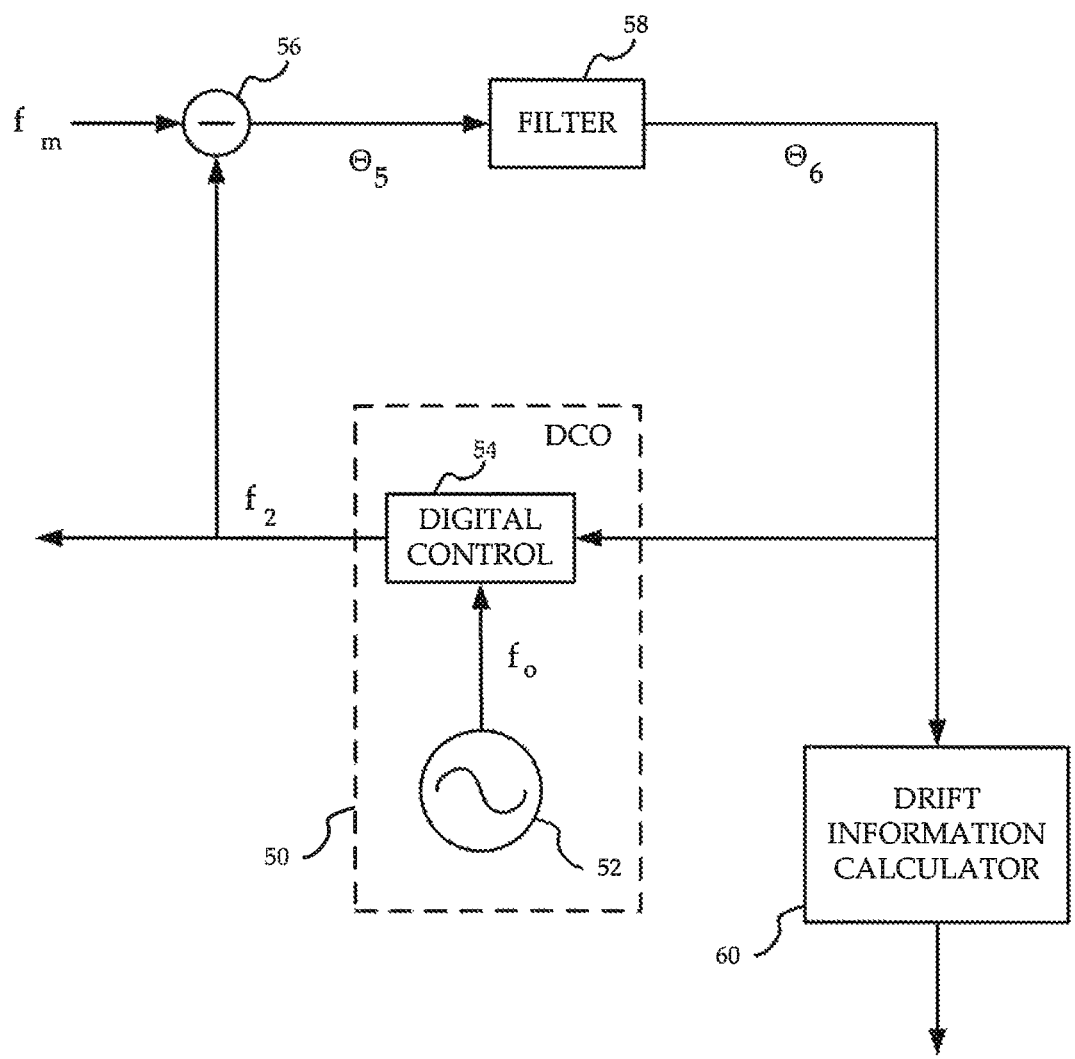
FIG. 3 is a block diagram of the timing portion of a slave node of FIG. 1 according to one embodiment of the invention.

Referring to FIG. 3, a block diagram of the timing portion of each slave node 16 of FIG. 1 according to one embodiment of the invention is shown. The timing portion receives an incoming signal $f_m$. This is the signal $f_m$ sent from the master node 12 to all slave nodes 16. The slave node 16 contains a Digitally Controlled Oscillator (DCO) 50. The DCO 50 includes a local oscillator 52 which produces an oscillator signal $f_o$. The oscillator signal $f_o$ has a center frequency of $f_o$ which is ideally stable, but in real life this frequency drifts slightly. A digital control circuit 54 within the DCO 50 adjusts this frequency using an adjustment value $\Theta_6$ to produce a DCO signal $f_2$. A phase comparator 56 compares the phase of the DCO signal $f_2$ with that of the incoming signal $f_m$ to produce a phase error $\Theta_5$. A filter 58 dampens out short term variations in the phase error $\Theta_5$ and over time provides a stable adjustment value $\Theta_6$. A PLL is thereby effected, and over time the DCO signal $f_2$ has the same frequency as the incoming signal $f_m$. The DCO signal $f_2$ is used by other components of the slave node 16 as the local timing signal.

The timing portion of each slave node 16 also includes a drift information calculator 60. This takes as input the adjustment value $\Theta_6$ and generates as output drift information for the slave node 16. This calculated drift information is a measure of how much the oscillator signal $f_0$ of the slave node needs to be adjusted by the digital control circuit 54 so as to match the frequency of the incoming signal $f_m$, and is sent to the master node 12 using a transmitter (not shown in FIG. 3) of the slave node 16.

The timing portion shown in FIG. 3 exists in each slave node 16. However the local oscillator 52 of each slave node may be different, and may have different drift. Accordingly, although the frequency of the incoming signal $f_m$ will be the same for each slave node 16, the values of the frequency of signal $f_o$ may be different for each slave node 16. The values of the adjustment values $\Theta_6$ needed to match $f_o$ with $f_m$ may therefore be different for each slave node 16, as may the drift information sent to the master node 12.

Broadly, the master node 12 receives drift information of each slave node 16 in a subnetwork from the respective slave node. Using the received drift information of each slave node, the master node determines a drift compensation factor. The master node then generates a corrected adjustment value using the drift compensation factor and drift information of the master node. The master node adjusts its local oscillator signal using the corrected adjustment value so as to generate a local timing signal. The local timing signal is also sent to each slave node 16, where it can be used by the slave nodes in adjusting the signals produced by their respective DCOs.

Figure 4:
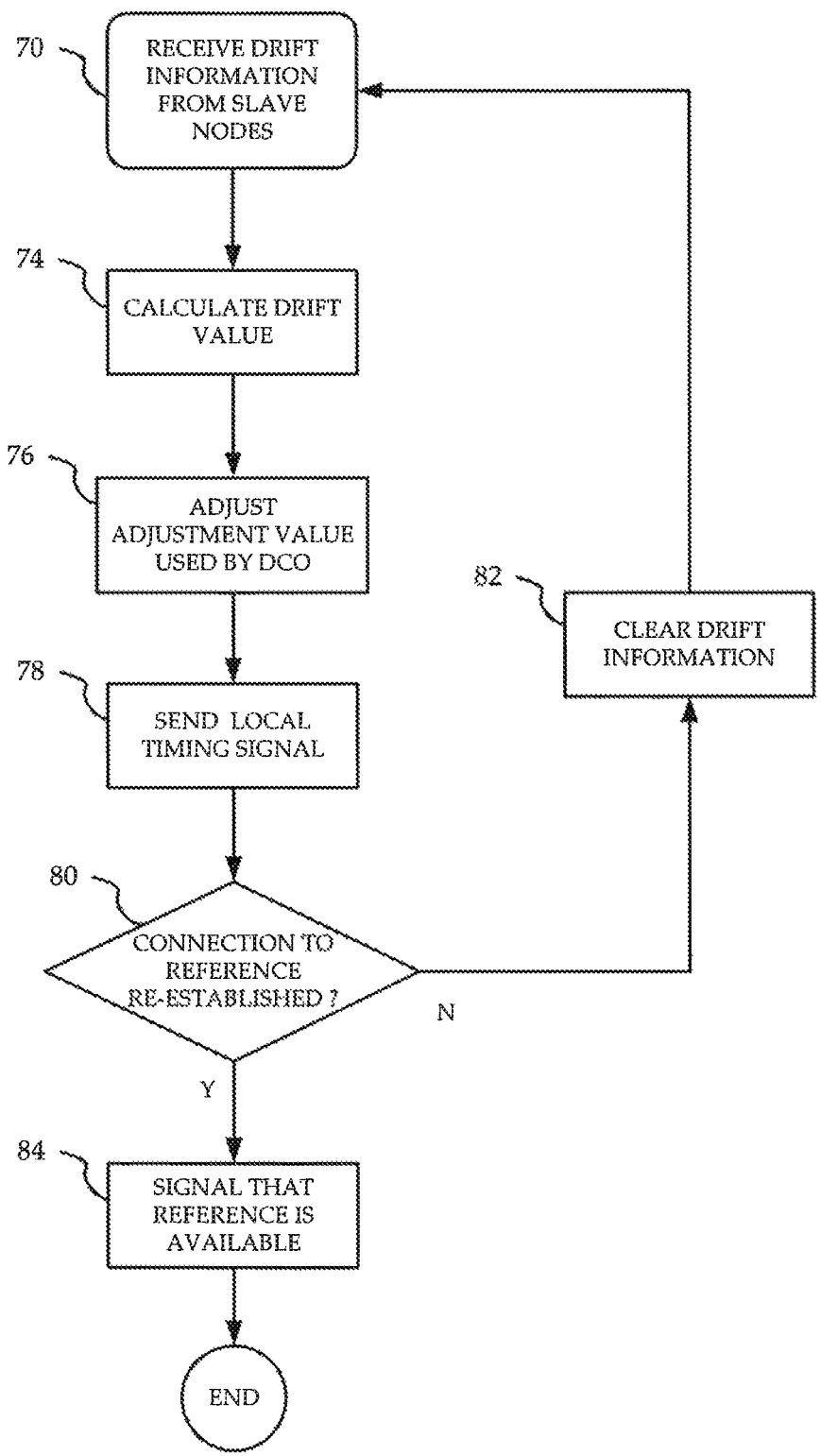
FIG. 4 is a flowchart of a method carried out by the master node of FIG. 1 according to one embodiment of the invention.

When the connection 14 between a subnetwork and the packet switched network 10 fails and contact with a reference clock is lost, an algorithm is run to determine which of the nodes is designated as the master node. The nodes that are not designated as the master node are designated slave nodes. All the nodes in the subnetwork place their high stability local oscillators in holdover. However the master node carries out a different method than the method carried out by the slave nodes. Referring to FIG. 4, a flowchart of a method carried out by the master node 12 of FIG. 1 according to one embodiment of the invention is shown.

At step 70 the master node 12 receives drift information from each of the slave nodes 16. The master node 12 continues receiving drift information until drift information has been received for all the slave nodes 16. At step 74 the master node 12 calculates a drift value using at least the received drift information for each slave node 16. Several examples of algorithms for calculating the drift value are given below. At step 76 the master node 12 uses the drift value as input to the adjustment value adjuster 40 to generate the corrected adjustment value $\Theta_4$. At step 78 the master node 12 sends the local timing signal to the slave nodes.

At step 80 the master node 12 determines if connection to the reference clock has been re-established. If not, then knowledge of the drift information of each slave node 16 is cleared at step 82 and the master node 12 returns to awaiting reception of fresh drift information from each slave node 16 at step 70. If it is determined at step 80 that connection to the reference clock has been re-established, then at step 84 the master node 12 signals to each slave node 16 that connection to the reference clock is once again available. As an alternative the slave nodes 16 determine that connection to the reference clock is available without the need for express notification from the master node 12, in which embodiment the step 84 is absent. In any case, once connection to the reference clock has been re-established, the procedure ends.

The drift value calculated at step 74 can be determined by the drift value calculator 41 in any manner, using at the least the drift information provided by each slave node 16. As a first example, the drift value calculator 41 disqualifies the fastest drift and the slowest drift, and then averages the remaining drifts to determine the drift value. As a second example, the drift value calculator 41 disqualifies the drift of nodes whose oscillator temperature changes beyond a preset threshold, then averages the remaining drifts to determine the drift value. The temperature change experienced by the local oscillator of a slave node may be passed to the master node 12 explicitly as part of the drift information, or may be estimated by the drift value calculator from knowledge of the nature of the slave nodes and its oscillator and from the amount of drift reported for that slave node. As a third example, the drift value calculator 41 may use a preset weighting system, in which knowledge of the nodes and their respective oscillators cause some nodes to be relied upon more than others when determining the drift value.

Figure 5:
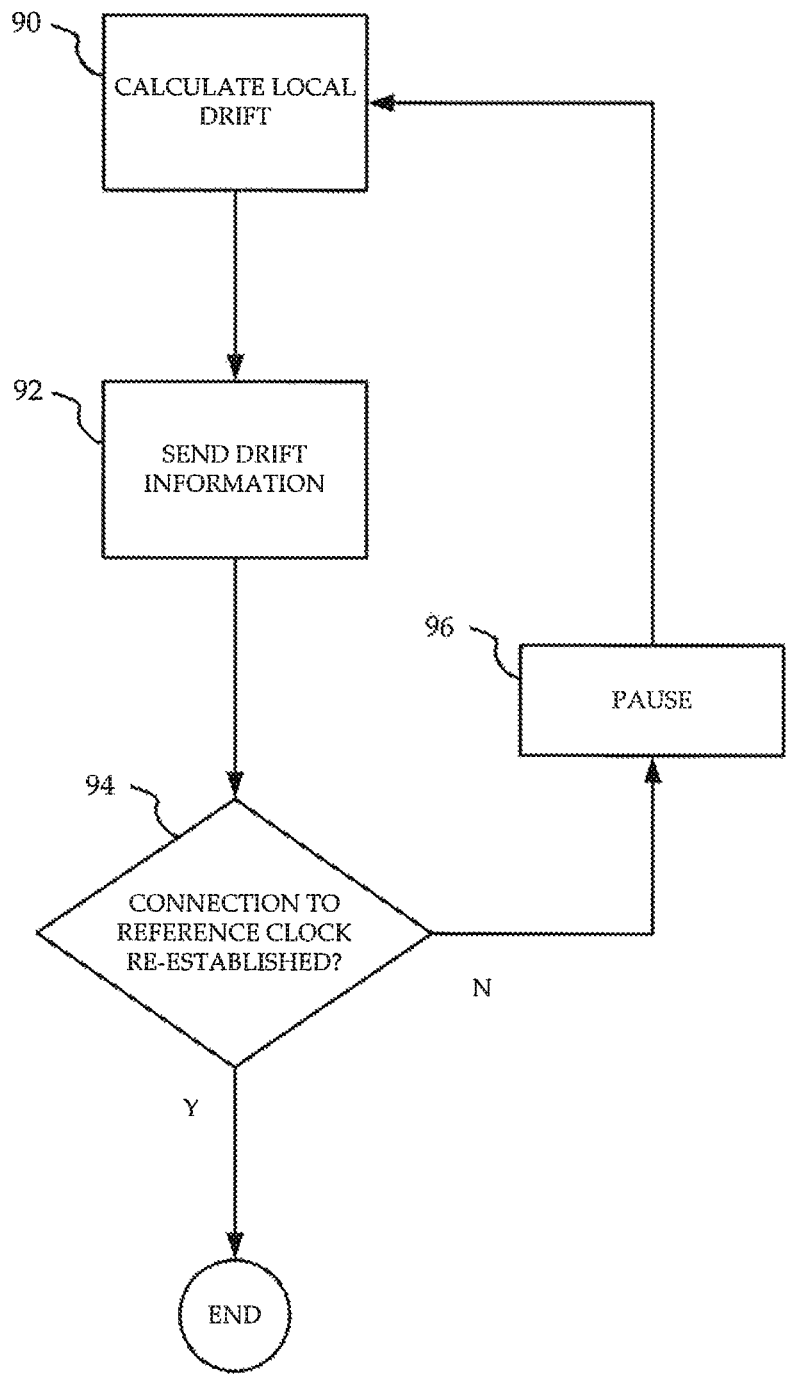
FIG. 5 is a flowchart of a method carried out by the master node of FIG. 1 according to one embodiment of the invention.

Referring to FIG. 5, a flowchart of a method carried out by each slave node 16 of FIG. 1 according to one embodiment of the invention is shown. The method is triggered when the node determines that it is a slave node. Thereafter, the slave node 16 routinely sends drift information about itself to the master node. At step 90 the drift information calculator 60 determines the local drift of the slave node 16 from the adjustment value $\Theta_6$ of the slave node 16. At step 92 the slave node 16 sends drift information to the master node 12. The drift information includes at least the local drift, but may also include additional information about the oscillator 52, such as the temperature at which the oscillator 52 is operating. The drift information is communicated to the master node 12 by any means, such by using IEEE 1588v2, Synchronous Ethernet, Ethernet Synchronization Message Channel, or SNMP. If additional information, such as the temperature at which the oscillator 52 is operating, is also to be sent, then TVL (time-length-value) fields can be added to the drift information messages.

At step 94 the slave node 16 determines whether connection to the reference clock has been re-established, such as by receiving notification from the master node 12 that connection has been re-established. Such notification can be sent by the master node 12 by any means, such as by adding a TLV field to any of IEEE 1588v2, Synchronous Ethernet, Ethernet Synchronization Message Channel, or SNMP messages. Another alternative is to determine that the origin of the incoming time signal is the reference clock rather than the master node 12. More generally, any method of determining whether connection to the reference clock has been re-established may be used. If connection to the reference clock has not been re-established then the routine pauses at step 96, the length of the pause depending on the implementation. The drift information calculator 60 then calculates the local drift again at step 92. The routine repeats until the slave node determines at step 94 that connection to the reference clock has been re-established, at which point the procedure ends.

In the embodiment described above, the slave nodes 16 send drift information to the master node 12 at regular intervals. In an alternate embodiment the slave nodes 16 send drift information to the master node 12 only when polled for such information from the master node 12. In yet another embodiment the intervals are not regular, such as sending drift information by a slave node 16 only when its local drift changes by a configured amount since when drift information was last sent to the master node 12.

In the embodiment described above, the timing signal $f_m$ of the master node is sent to the slave nodes using IEEE 1588v2. More generally, any timing over packet technology may be used for conveying the drift information or the timing signal $f_m$.

In the embodiment described above, each slave node 16 has a single oscillator 52. Alternatively, one or more of the slave nodes 16 may have more than one oscillator for the purposes of providing drift information to the master node 12. For each, if any, additional oscillator on the slave node the circuit shown in FIG. 3 exists. In other words for each additional oscillator there is a filter which also receives the timing signal $f_m$ and a drift information calculator for determining by how much the frequency of the additional oscillator would have to be corrected so as to match the timing signal $f_m$. Drift information for each oscillator in a slave node is calculated and sent to the master node 12. In this way, the master node 12 can take into account the drift of even more oscillators when calculating the drift value.

The drift value calculator, drift information calculator, and methods described above are preferably implemented as logical instructions in the form of software. Alternatively, any one or more of the logic of the methods, the drift value calculator, and the drift information calculator described above may be implemented as hardware, or as a combination of software or hardware. If in the form of software, the logic may be stored on a non-transitory computer-readable storage medium in a form executable by a computer processor. The logic of the drift value calculator and of the drift information calculator may be implemented by a general purpose processor, a network processor, a digital signal processor, an ASIC, or multiple such devices.

Figure 6:
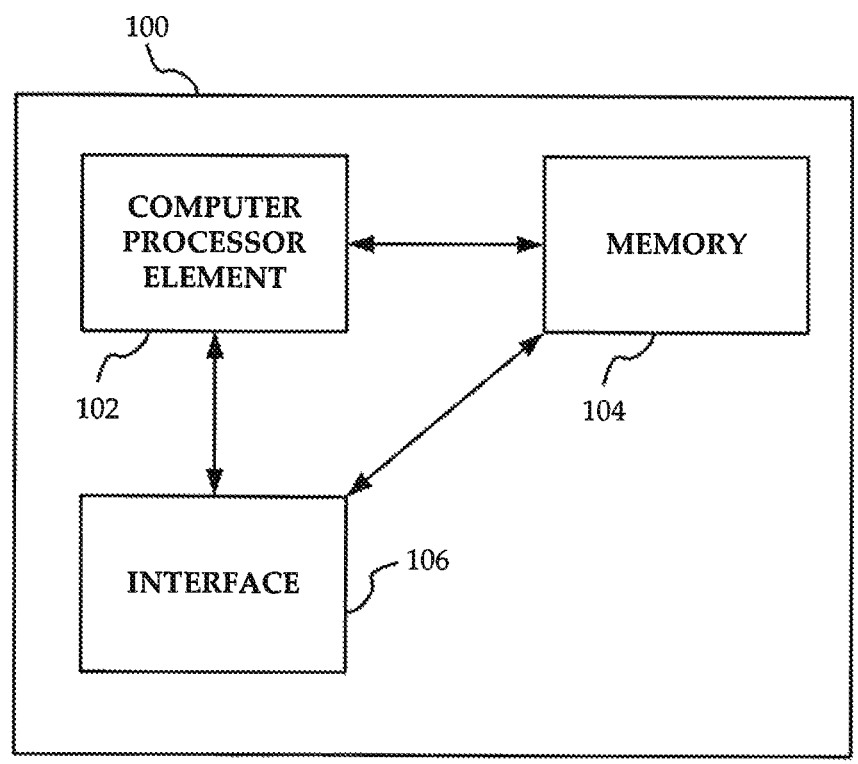
FIG. 6 is a block diagram of a computing environment according to one embodiment of the invention.

A simplified block diagram of one embodiment of the drift value calculator 41 is shown in FIG. 6 as a processor assembly 100. The processor assembly of FIG. 6 also shows an embodiment of the drift information calculator 60. The processor assembly 100 includes a computer processor element 102 (e.g. a central processing unit and/or other suitable processor(s)). The computer processor element 102 has access to a memory 104 (e.g. random access memory, read only memory, and the like). The processor element 102 and the memory 104 are also in communication with an interface comprising various I/O devices 106 (e.g. a user input device (such as a keyboard, a keypad, a mouse, and the like), a user output device (such as a display, a speaker, and the like), an input port, an output port, a receiver, a transmitter, and a storage device (such as a tape drive, a floppy drive, a hard disk, a compact disk drive, and the like)). In one embodiment, the drift value calculator 41 and/or the drift information calculator 60 are implemented as software instructions loaded into the memory 104 and causing the computer processor element 102 to execute the methods described above.

The embodiments presented are exemplary only and persons skilled in the art would appreciate that variations to the embodiments described above may be made without departing from the spirit of the invention. The scope of the invention is solely defined by the appended claims.

We claim:

1. A method of determining timing information in a subnetwork of telecommunication nodes when connection to a reference clock is lost, the subnetwork containing a master node and at least one slave node, the method comprising:
   receiving at the master node drift information of each slave node from the respective slave node;
   determining at the master node a drift compensation factor using the received drift information;
   generating a corrected adjustment value using the drift compensation factor and drift information of the master node; and
   adjusting a local oscillator signal of the master node using the corrected adjustment value so as to generate a local timing signal.

2. The method of claim 1 further comprising:
   transmitting the local timing signal from the master node to each slave node.

3. A first telecommunications node within a subnetwork comprising at least one additional telecommunications node, the first node comprising:
   a drift value calculator which calculates a drift compensation factor from drift information collected from each of the at least one additional node in the event that signals to a reference clock are unavailable;
   a local oscillator generating an oscillator signal; and
   a digital control circuit which generates a local timing signal from the oscillator signal, the drift compensation factor, and drift information of the first node.

4. The telecommunications node of claim 3 further comprising:
   a transmitter for transmitting the local timing signal to the at least one additional node.

5. The telecommunications node of claim 3 wherein the drift value calculator is in the form of a general purpose processor, a network processor, a digital signal processor, an ASIC, or multiple such devices.

6. A method of determining timing information in a subnetwork when connection to a reference clock is lost, the subnetwork containing a plurality of telecommunications nodes, each node having a local oscillator, the method comprising:
   designating one of the nodes as a master node, each of the remaining at least one node being designated a slave node;
   receiving at the master node drift information of each slave node from the respective slave node;
   determining at the master node a drift compensation factor using the received drift information;
   generating at the master node a corrected adjustment value using the drift compensation factor;
   adjusting a local oscillator signal of the master node using the corrected adjustment value and drift information of the master node to generate a local timing signal; and
   transmitting the local timing signal from the master node to each slave node.

7. The method of claim 6 further comprising:
   at each slave node, transmitting the drift information of the slave node to the master node.

8. The method of claim 7 wherein transmitting the drift information of the slave node comprises transmitting the drift information of each of at least one oscillator within the slave node.

9. The method of claim 8 further comprising transmitting the temperature at which each of the at least one oscillator operates to the master node.

10. A system comprising:
    a plurality of telecommunications nodes within a subnetwork, one of the nodes being a master node and each remaining node being a slave node;
    a drift information calculator on each slave node, each drift information calculator for determining drift information of a local oscillator of the slave node and for transmitting the drift information to the master node in the event that signals to a reference clock are unavailable;
    a drift value calculator on the master node for collecting the drift information from each slave node and for calculating a drift compensation factor from the collected drift information in the event that signals to a reference clock are unavailable;
    a digitally controlled oscillator at the master node for adjusting a local oscillator signal using the drift compensation factor and drift information of the master node so as to generate a local timing signal; and
    a transmitter on the master node for transmitting the local timing signal to each slave node.

11. The system of claim 10 wherein each drift information calculator determines the drift information of the local oscillator of its slave node as the output of a filter in a phase locked loop used to adjust the local oscillator frequency to the frequency of the local timing signal transmitted from the master node.

12. The system of claim 10 wherein at least one of the at least one slave node has at least two local oscillators, each with a corresponding drift information calculator, and wherein each drift information calculator determines drift information of the corresponding local oscillator.

13. The system of claim 10 wherein each drift information calculator is in the form of a general purpose processor, a network processor, a digital signal processor, an ASIC, or multiple such devices.

14. The system of claim 10 wherein the drift value calculator is in the form of a general purpose processor, a network processor, a digital signal processor, an ASIC, or multiple such devices.

* * * * *